S. INGERSOLL.
Hose-Couplings.
No. 196,904. Patented Nov 6, 1877.
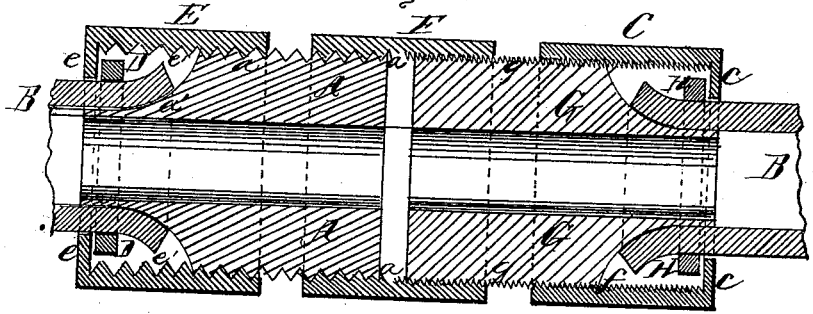
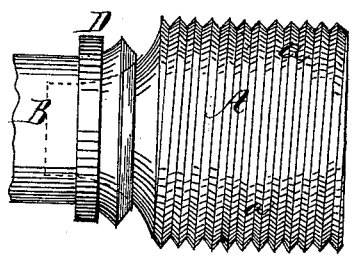
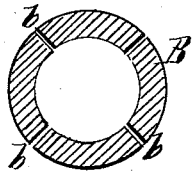

UNITED STATES PATENT OFFICE.

SIMON INGERSOLL, OF STAMFORD, CONNECTICUT.

IMPROVEMENT IN HOSE-COUPLINGS.

Specification forming part of Letters Patent No. 196,904, dated November 6, 1877; application filed April 14, 1877.

*To all whom it may concern:*

Be it known that I, SIMON INGERSOLL, of Stamford, county of Fairfield, and State of Connecticut, have invented a new and useful Improvement in Hose-Couplings, of which the following is a specification:

The object of this invention is to make a coupling for hose which will unite the different sections together firmly, and which may be loosened quickly.

The invention consists of a coupling which has a conical section that is to enter the interior of the hose, the end of which is split up a short distance from the end on opposite sides, so as to enable it to slide up on the said conical part, and a ring-follower that surrounds the hose just beyond the splits, which said ring is pressed by the surrounding part of the coupling up on the conical part of the interior piece, so as to firmly bind the end of the hose to the coupling as it is screwed together.

The invention will be readily understood by reference to the accompanying drawings, of which—

Figure 1 is a longitudinal sectional elevation of the improved coupling with hose. Fig. 2 is a detached end view of the coupling with the coupling-piece removed, showing, in full, the mode of fastening the hose to the coupling. Fig. 3 is an end elevation of the hose, showing the positions of the splits in it, that permit it to slide up or expand on the conical center.

The conical center piece A has an interior bore that coincides in size with the interior bore or opening of the hose B, that is to be coupled to it. One end of the piece A is threaded at $a$, for screwing into the union-piece E, and the other end of it is formed in a cone, $a'$, so as to permit it to pass inside of the bore of the hose.

The end of the hose has several radial splits or gashes, $b$, as shown in Fig. 3, which said splits should be in pairs diametrically opposite each other, and extend into the substance of the hose, say, three-eighths of an inch, more or less, from the end of it, so as to permit the end of the hose to expand or flare outwardly as the cone $a'$ enters it.

A ring, D, surrounds the hose just beyond the ends of the splits $b$, and when the parts are assembled together this ring is pressed by the annular flange $e$ of the coupling-piece E, which surrounds the hose and piece A, upon the outside of the cone $a'$, so as to hold the hose firmly thereon.

The threads $f$ and $g$, by which the pieces C and G are screwed together, are to be quite close, so as to permit great force to be applied to force the ring H up toward the cone-surface, for the purpose of uniting these parts together with great firmness; but the threads $a$, by which the union-piece E and the cone-piece A are screwed together, are to be much coarser, so as to work quickly in uncoupling, when desired.

The coupling-piece C has an annular flange, $c$, at one of its ends, which said flange rests against the annular flange H in a similar manner to the arrangement of the ring D.

Having described my invention, I claim—

The improved hose-pipe coupling described, consisting of the conical center piece A, with screw-threads $a$, cone $a'$, the coupling-pieces E and C, with flange $e$ and $c$, the rings D and H, the cone-piece G, and the union-piece F, all arranged to operate in combination with the hose B, having splits $b$, substantially as set forth and specified.

This specification signed this 2d day of April, 1877.

SIMON INGERSOLL.

Witnesses:
RICHD. GERNER,
CHR. RIEGELMAN.